United States Patent
Dalbiez et al.

(10) Patent No.: US 6,227,341 B1
(45) Date of Patent: May 8, 2001

(54) CLUTCH MECHANISM FOR MOTOR VEHICLE COMPRISING AN IMPROVED WEAR TAKE-UP DEVICE FOR FRICTION LININGS

(75) Inventors: André Dalbiez, Argenteuil; Jean-Pierre Giroire, Saint-Germain-en-Laye, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/403,229
(22) PCT Filed: Feb. 15, 1999
(86) PCT No.: PCT/FR99/00337
 § 371 Date: Jan. 21, 2000
 § 102(e) Date: Jan. 21, 2000
(87) PCT Pub. No.: WO99/41517
 PCT Pub. Date: Aug. 19, 1999

(30) Foreign Application Priority Data

Feb. 13, 1998 (FR) .................................................. 98 01769
Dec. 9, 1998 (FR) .................................................. 98 15533

(51) Int. Cl.[7] ..................................................... F16D 13/75
(52) U.S. Cl. .................................... 192/70.25; 192/111 A
(58) Field of Search ............................. 192/70.25, 111 A, 192/111 B

(56) References Cited

U.S. PATENT DOCUMENTS

| | | | |
|---|---|---|---|
| 3,752,286 | * 8/1973 | Sink ................................... | 192/111 A |
| 4,099,604 | * 7/1978 | Higgerson ......................... | 192/111 A |
| 4,228,883 | * 10/1980 | Palmer .............................. | 192/111 A |
| 5,029,687 | * 7/1991 | Asada et al. ....................... | 192/111 A |
| 5,090,536 | * 2/1992 | Asada ................................ | 192/70.25 |
| 5,186,298 | 2/1993 | Takeuchi . | |
| 5,251,737 | * 10/1993 | Flotow et al. ..................... | 192/111 A |
| 5,320,205 | * 6/1994 | Kummer et al. .................. | 192/70.25 |
| 5,634,541 | 6/1997 | Maucher . | |
| 5,803,223 | 9/1998 | De Briel et al. . | |
| 5,816,379 | * 10/1998 | De Briel et al. .................. | 192/70.25 |
| 5,887,689 | * 3/1999 | Young ............................... | 192/70.25 |
| 5,937,986 | * 8/1999 | Schubert ........................... | 192/70.25 |
| 5,944,157 | * 8/1999 | Blard et al. ................... | 192/70.25 X |
| 5,971,125 | * 10/1999 | Doremus et al. ................. | 192/70.25 |
| 6,021,877 | * 2/2000 | Weidinger et al. ............... | 192/70.25 |

FOREIGN PATENT DOCUMENTS

| | | |
|---|---|---|
| 2402114 | 3/1979 | (DE) . |
| 27503A1 | 3/1998 | (FR) . |
| 2313420 | 11/1997 | (GB) . |

* cited by examiner

Primary Examiner—Charles A Marmor
Assistant Examiner—Saul Rodriguez
(74) Attorney, Agent, or Firm—Liniak, Berenato, Longacre & White

(57) ABSTRACT

A clutch mechanism comprising a wear take-up device including a ring with ramps bearing an outer toothing and set between a pressure plate and support member (engagement zones) to constitute a pressure plate with varying thickness between its friction surface and the support member. A box having a worm screw cooperates with the toothing. A brake strap borne by the pressure plate and cooperating with the ramp ring is arranged such that in the vent of axial vibrations or overtravel of the clutch during declutching, the ramps do not rotate and there is no wear take-up.

12 Claims, 5 Drawing Sheets

Fig. 3
Fig. 4
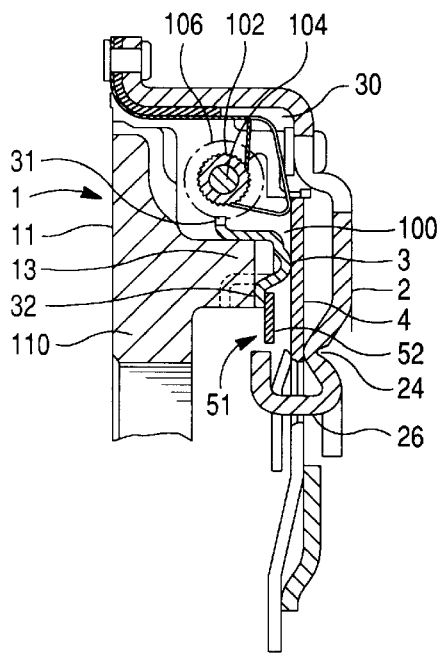
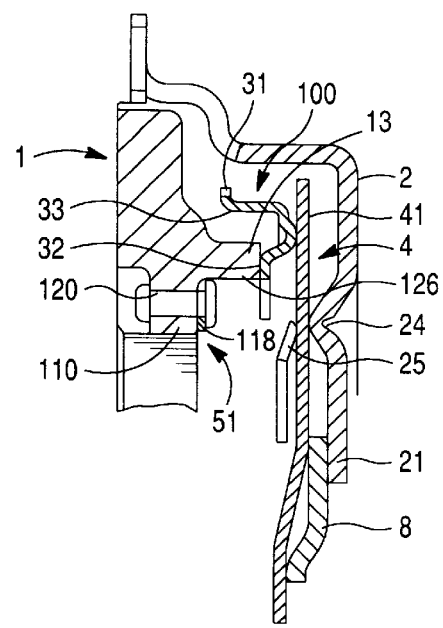
X-X
X-X
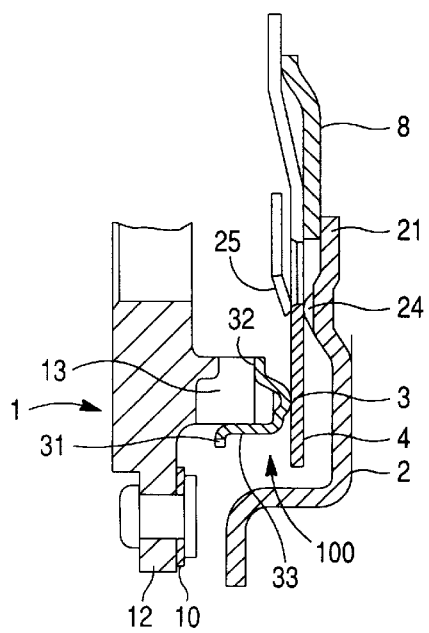
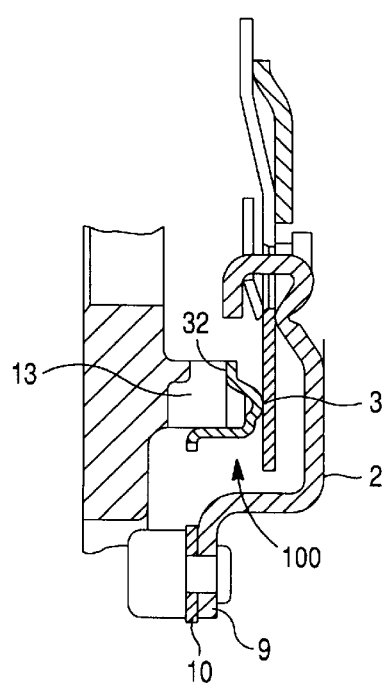

CLUTCH MECHANISM FOR MOTOR VEHICLE COMPRISING AN IMPROVED WEAR TAKE-UP DEVICE FOR FRICTION LININGS

BACKGROUND OF THE INVENTION

1. Field of the Invention

The present invention relates to a clutch mechanism, especially for a motor vehicle.

In general terms the invention relates to a friction clutch, especially for a motor vehicle, and more particularly relates to a clutch equipped with a take-up or compensating device for wear which is due in particular to wear in the friction liner or liners, this device working to the extent that wear takes place in the liner or liners.

The invention relates to the friction clutch mechanism which is included in such clutches.

2. Description of the Related Art

A conventional clutch mechanism includes, in particular, a cover plate, a pressure plate coupled in rotation to the cover plate while being displaceable axially with respect to the latter, engagement means carried by the pressure plate, and axially acting clutch engagement means which act between the cover plate and the engagement means.

The clutch also includes a reaction plate which is part of an engine flywheel, which may be in two parts so as to form a damped flywheel or a flexible flywheel, mounted in rotation on a first shaft, which is typically a driving shaft such as the crankshaft of the internal combustion engine associated with the clutch, and supporting through its outer periphery the cover plate to which the pressure plate is attached with axial mobility.

The pressure plate is fixed in rotation to the cover plate and the reaction plate, while being displaceable axially under the action of axially acting clutch engagement means controlled by declutching means.

The declutching means may consist in a known way of helical springs, or two Belleville rings mounted in series, which are acted on by declutching levers that constitute the declutching means.

Generally, the clutch engaging and declutching means are both part of a common component, for example a metallic diaphragm which bears on the base of the cover plate. The diaphragm may be mounted in series or in parallel with a Belleville ring so as to provide assistance to the declutching force.

A friction disc, which typically carries friction liners at its outer periphery and which is fixed in rotation to a shaft, typically a driven shaft such as the input shaft of the gearbox of the propulsion engine unit, is interposed between the pressure plate and the reaction plate in such a way as to be gripped between them when the clutch is in its engaged position, for transmitting the torque from the driving shaft to the driven shaft. Conventionally, the friction liners are mounted on an axially elastic support member, which is coupled rigidly or elastically to a hub that is mounted in rotation on the driven shaft. Thanks to this arrangement, the friction disc assists the diaphragm during the declutching operation of the clutch.

In another version, the support member is encapsulated in a friction liner. In all cases the friction disc includes at least one friction liner, and has two friction faces for cooperation with the pressure plate and the reaction plate respectively.

The clutch engaging means, the cover plate and the pressure plate are part of a unitary assembly which is referred to as a friction clutch mechanism.

The clutch engaging means control the axial displacement of the pressure plate when they are actuated by a clutch release bearing through declutching means.

In the course of the working life of such a clutch, the friction liner or liners and the counter-acting materials, pressure and reaction plates, become worn, which causes a variation to occur in the axial position of the pressure plate and that of the axially acting clutch engaging means, as well as the clutch release bearing, and the result of this is a variation in the gripping force exerted between the friction disc on the one hand and the pressure and reaction plates on the other, because of the modifications of the working conditions of the clutch engaging means. The force which is necessary for disengagement is thereby affected. By giving such a clutch a wear compensating device these disadvantages are avoided, and the clutch engaging means, together with the clutch release bearing, which is typically in constant engagement on the clutch engaging means, then occupies the same position when the clutch is in its engaged condition, so that the axial size of the clutch is reduced.

In French patent application FR-A-2 753 503, applied for on Sep. 17, 1996, there is proposed a wear compensating device which comprises, firstly, ramp means fixed in rotation to an external set of teeth and placed between the pressure plate and the engagement means so as to constitute a pressure plate of variable thickness between its friction face, for engaging the appropriate friction liner of the friction disc, and the engagement means, and including, secondly, a cassette which is mounted in a housing of the cover plate and which includes a worm in cooperation with the set of teeth of the ramp means, and of the type in which the engagement means, the external set of teeth and the ramps are all part of a single component, in the form of an annular adjusting ring carried by the pressure plate.

The worm of the cassette is in cooperation with the teeth of the set of teeth that are part of the adjusting ramp ring which is placed between the clutch engaging means and the pressure plate.

The worm is in cooperation both with the set of teeth and with means for driving in rotation which comprise a helical spring, and which are rendered operational by wear in the friction liners when the clutch is engaged. The worm is mounted tangentially with respect to the set of teeth associated with it. In another version, the set of teeth is part of an intermediate member, as described in the document FR 98 11991 applied for on Sep. 23, 1998, coupled in rotation to the ramp ring by a coupling which permits this ring to move axially.

In the document FR-A-2 402 114, a solution was proposed for improving the operation of such a wear compensating device so that, on the occurrence of axial vibration produced by the crankshaft of the engine, or in the event of an overtravel of the clutch engaging means during the declutching operation, the ramps do not rotate and no take-up of wear takes place. More precisely, in the said document FR-A-2 402 114, a plurality of elastic attachments in the form of loops act between the adjusting ramp ring and the pressure plate.

Each attachment is fixed to an internal ear of the ring, and has a free end in contact with an ear of the pressure plate.

In that document, the adjusting ring is fixed in rotation by means of axial projections of the pressure plate which penetrate into complementary apertures formed in the adjusting ramp ring. The adjusting ring therefore does not have as simple a form as is desirable.

An object of the present invention is to mitigate this drawback, while continuing to benefit from improved operation of the wear compensating device.

SUMMARY OF THE INVENTION

The invention proposes a clutch mechanism with a wear compensating device, of the type mentioned above and having a rotatable adjusting ramp ring, characterised in that it includes at least one elastic braking tongue, having a first end carried by the pressure plate and a second end which cooperates with the ramp ring, being offset circumferentially with respect to the first end.

Thanks to the invention, operation is improved as in the document FR-A-2 402 114, so that no wear compensation takes place in the event of axial vibrations and/or torsional vibrations produced by the crankshaft of the engine, or in the event of an overrun of the clutch engaging means during the declutching operation.

The adjusting ramp ring is of simplified form, and is rotatable with respect to the reaction plate. It is therefore possible to make use of the ring in the documents FR-A-2 753 503 or FR-98/11991 mentioned above. Because of the circumferential offset of the ends of the tongues, a braking effect is obtained without any danger of destruction.

In this connection, the elastic attachments of the document FR-A-2 402 114 are unable to cooperate with a rotating ring, because in the event of rotation of the ring, these attachments would undergo tearing, which is prejudicial to their useful life.

The braking tongues according to the invention are accordingly configured so as to cooperate with a rotatable adjusting ramp ring.

According to further features of the invention:

the braking tongue is fixed to the inner periphery of the pressure plate, and it extends in a direction which is generally tangential with respect to the circumference of the mechanism, so that the tongue works under favourable conditions;

one of the tangential ends of the braking tongue includes a projecting element that cooperates with a facing portion of the ring having the ramps, which thus has a double function;

the projecting element extends radially outwards and cooperates with the facing axial face of one of the ramps of the ring having the ramps;

the projecting element is biased axially into engagement against the said axial face of one of the ramps, so as to clamp the ramp ring between the braking tongue and the facing portion of the pressure plate;

the projecting element extends tangentially and cooperates with an inner peripheral edge of the ring having the ramps;

the said edge is the inner peripheral edge of one of the ramps of the ramp ring;

the projecting element is biased axially into engagement against the said inner edge;

the projecting element has a curved working portion, the convex face of which cooperates with the said portion of the ring having the ramps;

the braking tongue is fixed to the pressure plate by riveting;

the body of the rivet for fastening the braking tongue is parallel to the axis of the mechanism, and extends through a hole formed in the central portion of the braking tongue, which is configured as a plate element adjacent to an axial face which faces the pressure plate;

the other tangential end of the braking tongue cooperates with a boss of the pressure plate for positioning the braking tongue angularly about the axis of the rivet.

Further features and advantages of the invention will appear on a reading of the following detailed description, for an understanding of which, reference will be made to the attached drawings, in which:

BRIEF DESCRIPTION OF THE DRAWINGS

FIGS. 3 and 4 are views in cross section taken on the lines 3—3 and 4—4 respectively in FIG. 1;

DETAILED DESCRIPTION OF THE PREFERRED EMBODIMENT

Figure 1:
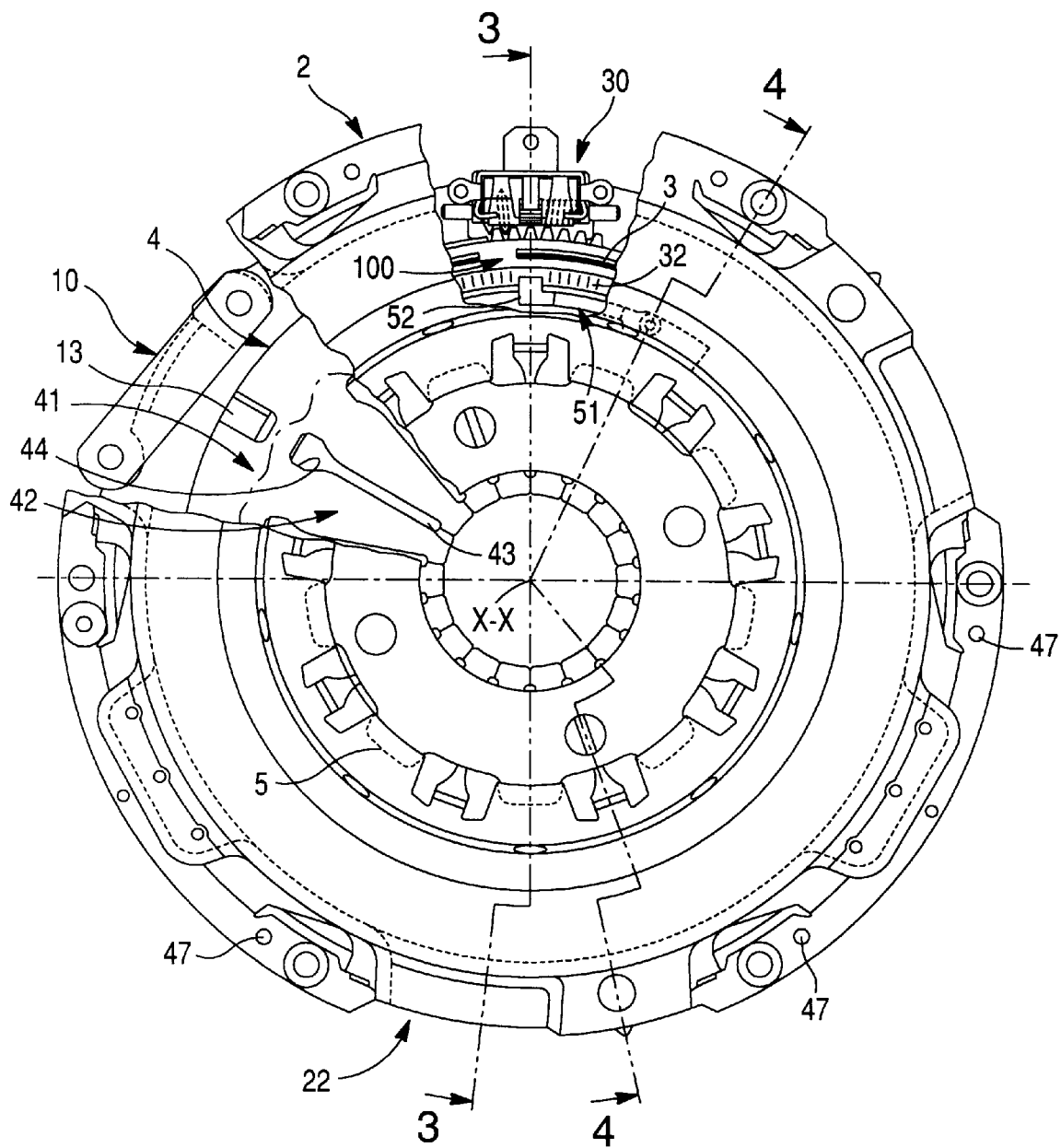
FIG. 1 is a front view of a clutch mechanism in a first embodiment of the invention, partly cut away in some places to show the diaphragm, a tangential braking tongue, and the wear compensating device comprising the cassette and the adjusting ramp ring.

The drawings show a clutch mechanism that constitutes a unitary assembly which is attached, usually by screw fastening, on a reaction plate, with insertion of a friction disc between the reaction plate and the pressure plate which is part of the clutch mechanism.

In the context of application to a motor vehicle, the reaction plate is fixed to the crankshaft of the internal combustion engine, with which it is rotatable to form a driving shaft, while the friction disc has at its outer periphery friction liners which are fixed to a support plate, which may be double, and which is deformable elastically in the axial direction and coupled rigidly or elastically to a hub, the hub being rotatable with it and being, in this example, the input shaft of the gearbox that constitutes the driven shaft. In another version, the support is rigid axially and is partly encapsulated in a single friction liner.

It is the friction liner or liners which are therefore arranged to be gripped releasably between the pressure plate and the reaction plate, so as to transmit the torque from the engine of the vehicle to the input shaft of the gearbox. For this purpose, axially acting clutch engaging means are arranged to grip the friction liners (not shown) between a front transverse friction face 11 which is formed on the front of the pressure plate 1, and a friction face formed on the back of the reaction plate (not shown in the drawings), which may be carried by a flexible disc fixed to the crankshaft, or it may be mounted for rotation on a first mass fixed to the crankshaft, with resilient members being interposed between the two masses so as to constitute a damped flywheel.

The clutch engaging means constitute a unit with disengaging means which are arranged to counteract, as required, the action of the clutch engaging means which engage, firstly on the inner face of a hollow rear cover plate 2, and secondly on engagement means 3 carried by the pressure plate 1, and constituting the rear transverse face of the pressure plate, facing towards the base of the rear cover plate 2.

The declutching means comprise for example declutching levers having inner ends on which a clutch release bearing (not shown) acts.

In the example shown in the drawings, the clutch engaging and declutching means are incorporated in a common component which is a so-called diaphragm 4.

The diaphragm 4 has a generally frusto-conical form in the free state, and it has a sinusoidal characteristic curve (of force exerted as a function of its deflection).

The same characteristic curve is obtained with a Belleville ring.

It will be recalled that the diaphragm 4 comprises an external peripheral portion in the form of a Belleville ring portion 41 which constitutes the clutch engaging means. This peripheral portion is extended radially towards the centre, towards the axis X—X of the clutch mechanism, by a central portion which is divided into radial fingers 42 by blind slots 43. The fingers 42 constitute declutching levers, while the slots 43 are open at their inner ends in the central aperture of the diaphragm 4, and at their outer periphery in widened apertures 44 which constitute the blind ends of the slots 43, these apertures 44 being in this example substantially rectangular.

The clutch mechanism therefore comprises, as a unit, an assembly of generally annular components, namely the pressure plate 1 at the front, the cover plate 2 at the rear, made in this example as a metal pressing, and the diaphragm 4 which bears axially, firstly against the base of the cover plate 2, and secondly against the engagement means 3, so as to grip the friction liners axially between the front transverse face 11 of the pressure plate 1 and the corresponding friction face of the reaction plate.

Like the reaction plate, the pressure plate 1 is made of a mouldable material and is for example a casting, and it is coupled in rotation to the cover plate 2 while being able to be displaced axially with respect to the latter. In this example, this coupling is obtained by means of tongues 10 which are deformable elastically in the axial direction, and which are oriented tangentially, being secured, in this case by riveting, to the cover plate 2 at one of their ends, while at their other end they are fixed to the pressure plate 1. More precisely, each tongue 10 is fixed to a lug 12 of the reaction plate 1, which is an axial outward projection, and to a transverse flange 9 of the cover plate 2. In another version, the tongues 10 are orientated radially.

The tongues 10 act as return means for the pressure plate 1. More precisely, the cover plate 2 has, firstly a base portion 21, which has a hole in its centre and which is oriented generally transversely at right angles to the axis X—X, and secondly, means 22 for fastening the cover plate 2 to the reaction plate.

The fastening means consist of a radial end flange 22 of the cover plate 2.

The diaphragm 4 bears axially at the outer periphery of its Belleville ring portion 41 on the engagement means 3, while the inner periphery of its Belleville ring portion 41 is mounted for tilting displacement between two abutments which are in axial face-to-face relationship, and which comprise respectively a secondary abutment 25 carried by axially oriented fastening lugs 26, and a primary abutment 24 which is carried, in facing relationship with the secondary abutment 25, by the base portion 21 of the cover plate 2. In the engaged state of the clutch, the diaphragm 4 is in engagement on the primary abutment and on the engagement means 3 of the pressure plate 1. In a known way, the lugs 26 are formed by stamping and bending the base portion 21 of the cover plate so as to project from it, being spaced apart circumferentially at regular intervals. The lugs 26 extend through the apertures 44 and have at their free ends a bend for locating a frusto-conical crown ring, the outer edge of which constitutes the abutment 25.

In order, when the clutch is engaged, to maintain the axially acting clutch engaging means 4 in a position which is independent of wear in the friction liners of the friction disc, and to a lesser extent wear in the pressure plate 1 and reaction plate 100, the so-called friction faces of which become worn in contact with the liners of the friction disc, a wear compensating device is provided, which comprises a cassette 30 and an annular adjusting ring 100 having ramps 32.

Figure 5:
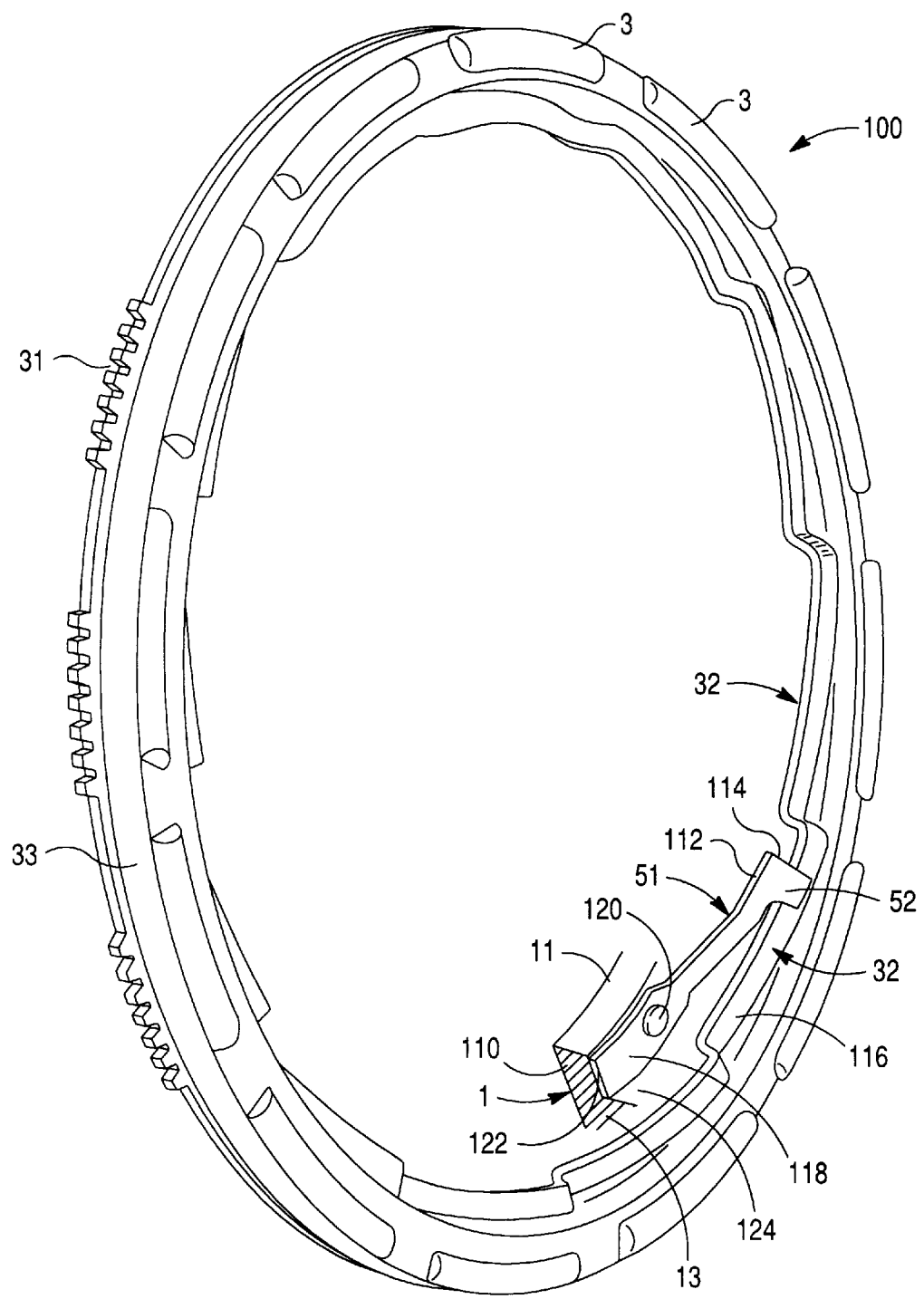
FIG. 5 is a view on a larger scale which shows the adjusting ramp ring in perspective, in association with a tangential braking tongue in the first embodiment.

More precisely, the adjusting ring 100 with its ramps 32 is an annular ring which is a reformed sheet metal pressing, the ramps 32 of which are disposed circumferentially at regular intervals, at its inner periphery in this example, with the adjusting ring 100 also having engagement zones 3 consisting of the rounded upper edges of arcuate press-formed ridges which are centred on the axis X—X of the clutch, and which are placed radially outwards of the ramps 32 (see in particular FIG. 5).

The pressure plate 1 in this example has, on its rear transverse face that faces towards the base portion 21 of the cover plate 2, pads 13 which are made integrally by moulding and which are spaced apart circumferentially at a distance from each other which corresponds to the distance that circumferentially separates two consecutive ramps 32, each of the pads 13 being arranged to cooperate with a ramp 32.

The adjusting ring 100 with its ramps 32 is located axially between the diaphragm 4 and the pressure plate 1, so that the pads 13 are in cooperation with the ramp 32, and so that the diaphragm 4 is in cooperation with the engagement zones 3, which thus constitute the engagement means, which are in this example of divided form but which, in another version, may be continuous, and through which the diaphragm 4 acts on the pressure plate 1.

At least one of the engagement zones 3 of the adjusting ring 100 with its ramps 32 is extended at its outer periphery by an axially oriented annular flange 33 parallel to the axis X—X, terminating in a transverse return, that is to say a return extending radially outwards in a plane at right angles to the axis X—X and provided, at its outer periphery, with a set of teeth 31 such that the axially oriented, radially outward flange 33 of the adjusting ring 100 is centred by a thickened portion of the pressure plate 1, in each of which a pad 13 is formed.

The pressure plate 1 therefore has a variable thickness, that is to say, more precisely, than the distance between its leading frontal friction face 11 and the coplanar engagement zones 3 varies as a function of the above mentioned wear.

The cassette 30 of the wear compensating device comprises, in a known way, a ratchet wheel 102 which is fixed to a spindle 104 that also carries a worm 106, the thread and pitch of which are matched to the set of teeth 31.

Figure 2:
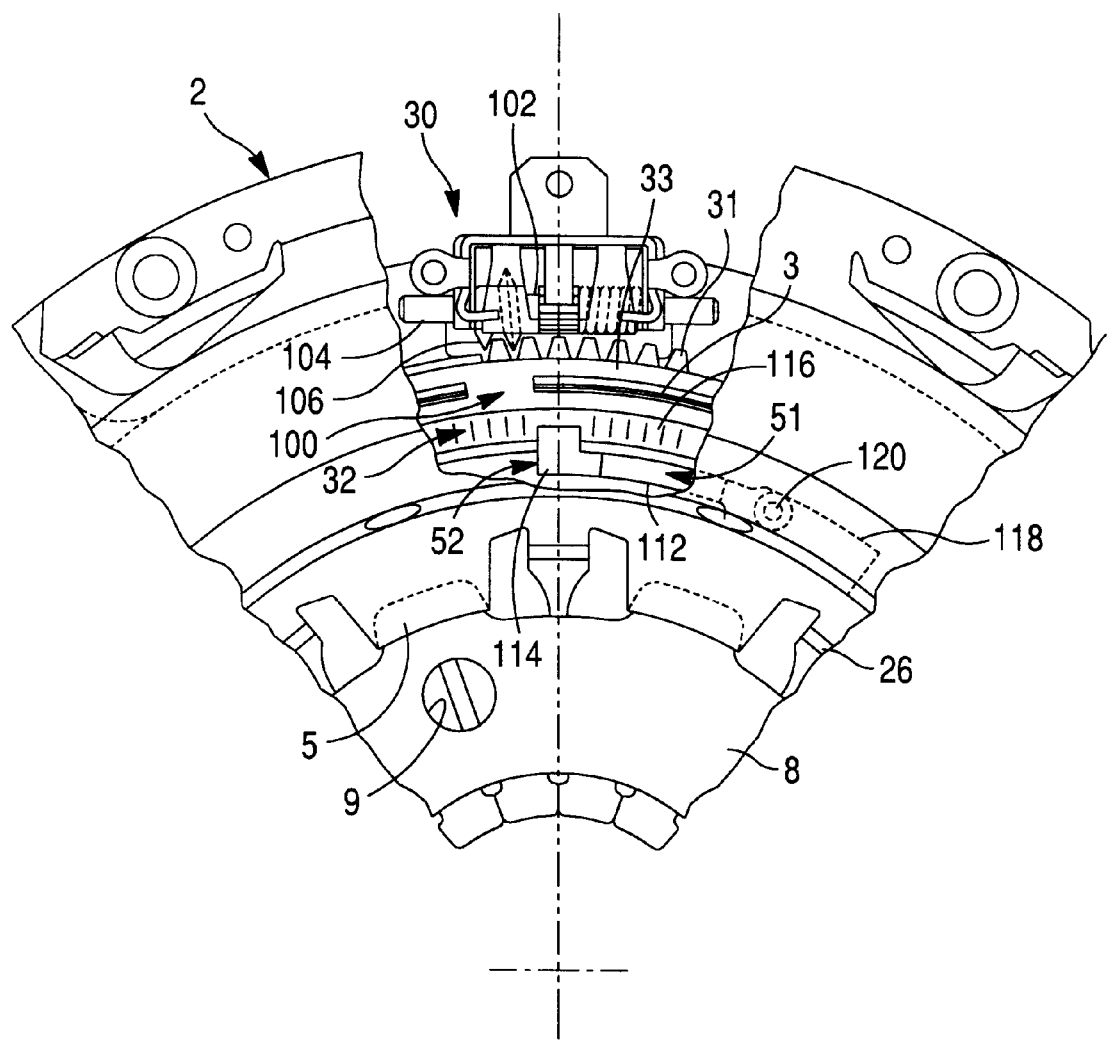
FIG. 2 is a detail view on a larger scale of the upper central part of FIG. 1.

The general operation of the wear compensating device 30, 100 which has just been described briefly is known, and will not be described in detail. If necessary, reference can be made to the contents of French patent applications Nos. FR-A-2 753 305, and FR-95/11991, of which the corresponding part of the description is to be regarded as forming part of the present Application. It will be recalled that the diaphragm 4 has at its outer periphery an appendix for acting on a control tongue (not given a reference sign in FIG. 3) which comes into engagement with the teeth of the ratchet wheel 102. In the event of wear, the diaphragm becomes inclined, and actuates, through the control tongue, the ratchet wheel 102, which compresses a take-up spring (not given a reference sign in FIG. 2). This take-up spring is fitted around the spindle 104 and works between the arm of a support member of the cassette 30 and the ratchet wheel, as can be seen in FIG. 2. The support is fixed on the cover plate as can be seen in FIG. 3. Thus, as wear takes place the take-up spring is armed, and as a function of the friction effects it is allowed to relax during an operation of engaging the clutch, so as to exert a thrust on the worm 106 and cause the set of teeth 31 of the ring 100 to rotate, the ring 100 being centred on the pressure plate because the flange 32 is in cooperation, through its inner periphery, with the outer periphery of an axial thickened portion of the pressure plate 1.

It is this thickened portion, which is annular in this example, that carries the pads 13 and serves as an annular surface for guiding and centring the ring 100. The ring 100 is accordingly mounted for rotation on the pressure plate 1.

The engagement means 3 for the outer periphery of the Belleville ring 41 of the diaphragm 4 thus consists of an axially oriented and divided annular boss of the adjusting ring 100, the ramps 32 of which are in cooperation with the rear transverse end face, which is preferably chamfered, of the pads 13 which constitute counter ramps.

In accordance with the features of the invention, rotational braking means for the adjusting ring 100 with its ramps 32, rotatable with respect to the pressure plate 1 with its pads 13, are provided.

These braking means consist of at least one tongue 51, which is a resilient metal braking tongue secured by riveting, screw fastening, bolts etc. to the transversely oriented inner radial periphery 110 of the pressure plate 1. A first end of the tongue 51 is carried by and fastened to the pressure plate 1, while the second end of the tongue 51 is in cooperation with the ramp ring 32, being offset circumferentially with respect to the first end.

In general terms, the braking tongue 51 extends tangentially with respect to a circumference of the assembly, and it has a projecting element 52 for frictional cooperation with one of the ramps 32 facing it, with the body of the tongue 51 being mostly under the corresponding ramp 32. The projecting element 52 is part of the second end of the tongue 51 and is oriented either transversely or radially.

Thus the adjusting ring 100, including the ramps 32, the engagement means 3, the flange 33 and the set of teeth 31, is pinched axially, in the region of a ramp 32, and to be more precise in this example, in the region of the ramp 32 that is situated facing the cassette 30, between the braking tongue 51, which in this example is elastic in the axial direction, and the corresponding pad 13. The elasticity of the tongue 51 depends on the length of the latter.

To be more precise, and as can be seen in particular in FIGS. 2 and 5, the body 112 of the braking tongue 51 is a metal plate component which lies generally in a transverse plane at right angles to the axis X—X, being slightly bent in such a way that its free first end includes the projecting element 52, which is extended radially outwards so as to lie facing the transversely oriented rear axial face 116 of the corresponding ramp 32, which thus has a double function and therefore cooperates with one of the pads 13 and with the braking tongue 51.

The other tangential end 118 of the body 112 of the braking tongue 51, namely the first end of the tongue 51, constitutes the part of the tongue by which it is fixed on the portion 110 of the pressure plate 1.

For this purpose, a rivet 120 passes through the portion 110 and the end portion 118 so as to hold the latter axially forward against the transversely oriented face 120 of the annular portion 110 of the pressure plate 1. In another version, the rivets 120 are replaced by other fastening members, screws etc.

In order to hold the braking tongue 51 in its tangential orientation, the first fastening end portion 118 is held against rotation by the cooperation of its radially outer edge 124 with a facing portion 126 of the corresponding pad 13. The tongue 51 is thus less sensitive to centrifugal force.

The second embodiment of a braking tongue 51, shown in FIGS. 6 and 7, will now be described.

In this second embodiment, the braking tongue 51 is still oriented generally tangentially, but it works radially, that is to say its free second end 114 includes a projecting element 152 which is in elastic engagement against the facing portion of the radially inner peripheral edge 130 of the corresponding ramp 32.

Figure 6:
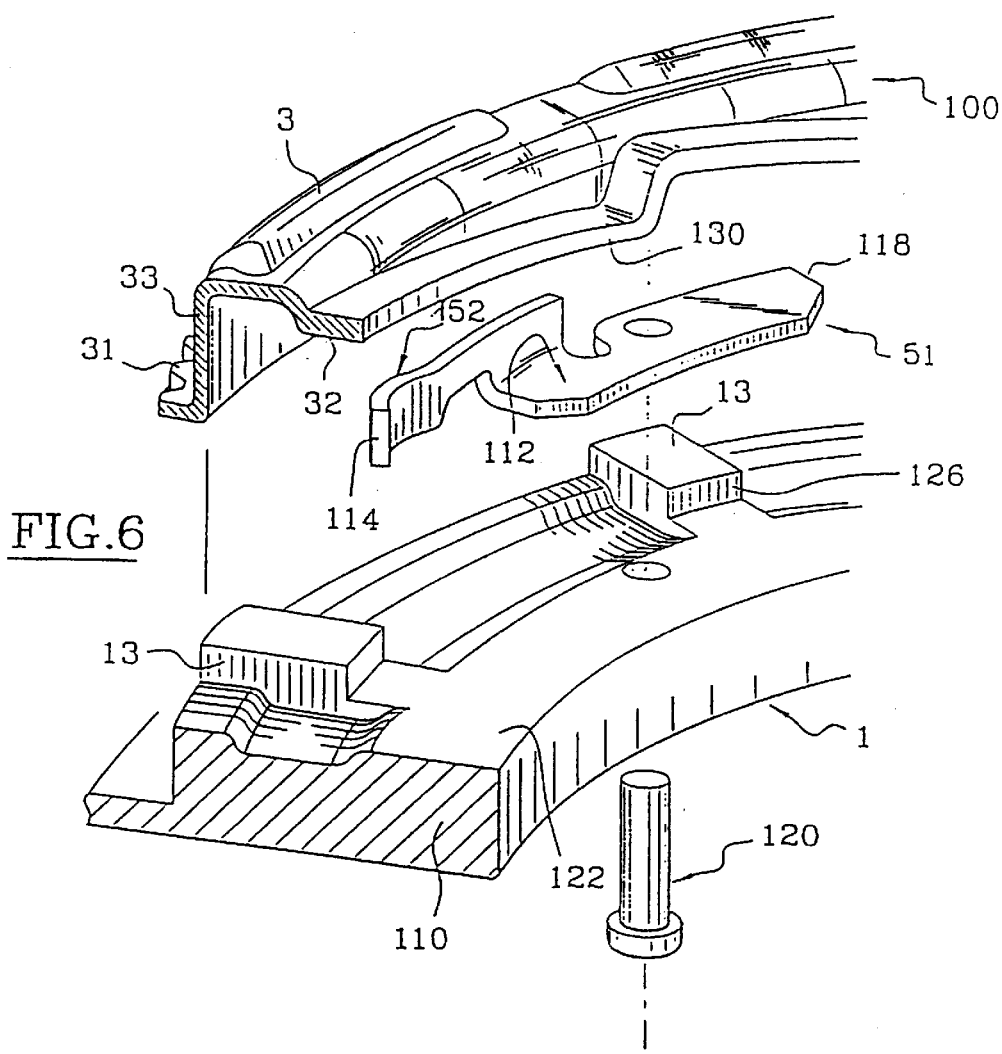
FIG. 6 is a detail view on a larger scale and in exploded perspective view, which shows a second embodiment of a braking tongue that cooperates with the adjusting ramp ring.
Figure 7:
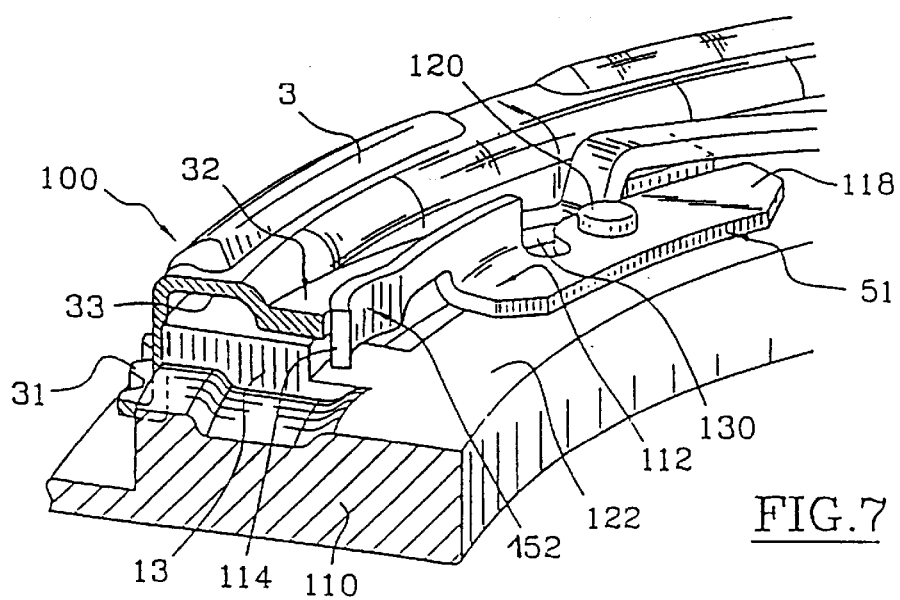
FIG. 7 is a view similar to that in FIG. 6, in which the components are shown assembled together.

The projecting element 152 preferably has a curved profile in the form of an axially oriented arc of a cylinder, the convexity of which is in cooperation with the radially inner peripheral edge 130 of the ramp 32, with the axial width, that is to say the height with reference to FIGS. 6 and 7, of the projecting element 52 being so designed that it is always in cooperation with the edge 130 regardless of the angular position of the adjusting ring 100, that is to say regardless of what may be the adjusted axial position of the latter with respect to the pressure plate 1.

It is one of the pads 13 which, as in the preceding Figure, defines by its bearing surface the portion 126 with which the outer axial edge of the first end of the tongue cooperates. The faster the pressure plate rotates, the more the tongue 51 exerts a gripping action on the inner edge of the ring.

As described in the document FR-98/11991 applied for on Sep. 23, 1998, the set of teeth 31 may of course be part of an intermediate member which is located for straight line movement on the cover plate, and which is coupled in rotation to the ring 100 while permitting axial movement of the ring. For example, the tongues 10, all in the same set, have an extension for pinching the intermediate member coupled to the ring by means of a coupling of the tenon and mortice type, or by tongues of the same type as the tongues 10.

The invention is applicable to a mechanism of the same type as that described in the document FR-A-2 424 442, in which the diaphragm has a peripheral lug received in an aperture of a drum coupled to the worm through a clutch having a one-way spring.

The presence of a control tongue is therefore not obligatory, and the cassette 30 can be replaced by a drum system with a worm, and with a spindle carried by the cover plate, as described in the document FR-A-2 424 442, to which reference should be made for more detail.

The braking tongue may act on the ramps cooperating with the counter-ramps applied on the pressure plate, as described in the document FR-A-2 424 442. The tongue can therefore act at the outer periphery of the pressure plate.

The drawings show at 8 a support member in the form of an annular ring carrying at its outer periphery locating lugs (not given a reference sign in FIG. 1) which project radially outwards.

The locating rings are inserted axially between abutment lugs 5 of the base portion 21 of the cover plate 2 at its inner periphery, and the fingers 42 of the diaphragm. The ring 8 has at its inner periphery a bead (without a reference sign) for contact with the inner periphery of the fingers 42.

The ring 8 protects the cassette 30 before the clutch mechanism is mounted on the reaction plate or on a component fixed to the reaction plate.

Mounting of the ring 8 between the lugs 5 and the fingers 42 is achieved in particular by rotating the ring 8 using one or more tools engaged with holes 9 formed in the ring. The lugs 5, which are oriented radially, are arranged alternately with the lugs 26, so that a bayonet type mounting of the ring 8 is obtained, the locating lugs of the ring 8 being brought under the lugs 5.

The ring 8 is disconnected by rotating it in the opposite direction. The cover plate 2 has three housings, two of which (not given reference signs) can be seen in FIG. 1.

These housings are formed at the outer periphery of the cover plate 2. One of the housings has an open base for mounting the cassette 30.

The other two housings have bases which are closed for mounting prebalancing rivets; for more detail reference should be made to the document FR-98/01769, from which priority is claimed:

As described in that document, the cover plate has on either side of the housings holes 47 for mounting balancing rivets.

Thus it is easily possible to balance the clutch mechanism. This is not disadvantaged by the braking tongue 51.

In another version, the diaphragm is mounted pivotally on the cover plate 2, with the aid of short posts or any other means carrying the secondary abutment 25. The braking tongue 51 of FIG. 5 can of course be interposed axially, by means of its projecting element 52, between the pads 13 and the ramps 32, in order to apply braking to the ring.

The presence of the ring 8 is not obligatory. Thus the base of the cover plate may be extended inwardly so as to define an abutment which is offset axially with respect to the primary abutment, in a direction away from the pressure plate.

It is on this abutment that the diaphragm bears before the clutch mechanism is fitted on the reaction plate, so that the cassette is protected.

The cassette can of course have another form, as described for example in the document PCT-FR99/00261 applied for on Feb. 5, 1998.

Thus, in the light of that Application PCT/FR99/00261, the resilient member may constitute by itself a support for the cassette. The take-up spring may be disposed outside the cassette, being for example fitted between a pad and a ramp. In that case, the housing of the cover plate may constitute the support for the cassette.

What is claimed is:

1. A clutch mechanism comprising a cover plate (2), a pressure plate (1) coupled in rotation to the cover plate (2) while being displaceable axially with respect to the latter, engagement means (3) carried by the pressure plate (1), axially acting clutch engagement means (4, 41) acting between the cover plate (2) and the engagement means (3), and a wear compensating device comprising, firstly, means (100) having ramps (32) which are fixed in rotation to an external set of teeth (31) and which are placed between the pressure plate (1) and the engagement means (3) so as to constitute a pressure plate (1, 200) having a variable thickness between its friction face (11) and the engagement means (3), and comprising, secondly, a cassette (30) carried by the cover plate (2) and including a worm (106) in cooperation with the set of teeth (31) fixed in rotation to the ramp means (32), and in which the engagement means (3) and the ramps (32) are made as a single member in the form of an annular ring (100) carried by the pressure plate (1), wherein the clutch mechanism includes at least one braking tongue (51) carried by the pressure plate (1) and cooperating with the annular ring (100) having the ramps (32) so that, in the event of axial vibrations or during an overrun of the clutch engaging means during a declutching operation, the ramps (32) do not rotate and no take-up of wear takes place.

2. A clutch mechanism according to claim 1, wherein the braking tongue (51) is fixed to the inner periphery (110) of the pressure plate (1), and in braking tongue extends between tangential ends in a direction which is generally tangential with respect to the circumference of the mechanism.

3. A mechanism according to claim 2, wherein one (114) of the tangential ends of the braking tongue (51) includes a projecting element (52) that cooperates with a facing portion of the ring having the ramps (32).

4. A mechanism according to claim 3, wherein the projecting element (52) extends radially outwards and cooperates with a facing axial face (116) of one of the ramps (32) of the ring (100) having the ramps (32).

5. A mechanism according to 4, wherein the projecting element (52) is biased axially into engagement against the axial face (116) of one of the ramps (32), so as to clamp the ramp ring (100) between the braking tongue (51) and a facing portion of the pressure plate (1, 13).

6. A mechanism according to claim 3, wherein the projecting element (52) extends tangentially and cooperates with an inner peripheral edge (130) of the ring (100) having the ramps (32).

7. A mechanism according to claim 6, wherein the edge is the inner peripheral edge (130) of one of the ramps (32) of the ramp ring (100).

8. A mechanism according to claim 5, wherein the projecting element (52) is biased axially into engagement against the said inner edge (130).

9. A mechanism according to claim 8, wherein the projecting element (52) has a curved working portion, the convex face of which cooperates with the portion (116, 130) of the ring (100) having the ramps (32).

10. A mechanism according to claim 3, wherein the braking tongue (51) is fixed to the pressure plate (1) by riveting (120).

11. A mechanism according to claim 10, wherein the body of the rivet (126) for fastening the braking tongue (51) is parallel to the axis (X—X) of the mechanism, and extends through a hole formed in the central portion (112) of the braking tongue (51), which is configured as a plate element adjacent to an axial face (122) which faces the pressure plate (1, 110).

12. A mechanism according to claim 11, wherein a other of the tangential ends (118) of the braking tongue (51) cooperates with a boss (13) of the pressure plate (1) for positioning the braking tongue angularly about the axis of the rivet (120).

* * * * *